US012345636B2

(12) United States Patent
Schweitzer et al.

(10) Patent No.: US 12,345,636 B2
(45) Date of Patent: Jul. 1, 2025

(54) TERAHERTZ CHARACTERIZATION OF A MULTI-LAYERED TIRE TREAD

(71) Applicant: The Goodyear Tire & Rubber Company, Akron, OH (US)

(72) Inventors: Claude Schweitzer, Colmar-Berg (LU); Pierre Felix Orlewski, Ettelbruck (LU); Christian Jean-Marie Kaes, Schrondweiler (LU); Abdulkareem Modupe Melaiye, Akron, OH (US); Michael Freylinger, Akron, OH (US); Sylvain Fourme, Medernach (LU); Pauline Monique Ghislaine Delroisse, Vance (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 11 days.

(21) Appl. No.: 18/532,690

(22) Filed: Dec. 7, 2023

(65) Prior Publication Data
US 2024/0102926 A1    Mar. 28, 2024

Related U.S. Application Data

(63) Continuation of application No. 17/823,087, filed on Aug. 30, 2022, now Pat. No. 11,874,223.

(51) Int. Cl.
*G01N 21/35*    (2014.01)
*G01N 21/3563*    (2014.01)
*G01N 21/3581*    (2014.01)

(52) U.S. Cl.
CPC ..... *G01N 21/3581* (2013.01); *G01N 21/3563* (2013.01); *G01N 2201/0696* (2013.01)

(58) Field of Classification Search
CPC .......... G01N 21/3581; G01N 21/3563; G01N 2201/0696
See application file for complete search history.

(56) References Cited

U.S. PATENT DOCUMENTS

| 7,119,896 B2 * | 10/2006 | Godeau | G01B 11/06 356/237.2 |
| 2010/0012248 A1 * | 1/2010 | Meuret | B60C 1/0016 152/526 |

(Continued)

FOREIGN PATENT DOCUMENTS

| EP | 0485127 A1 | 1/1991 |
| EP | 2568277 A1 | 3/2013 |

(Continued)

OTHER PUBLICATIONS

Okano et al., Internal Status of Visibly Opaque Black Rubbers Investigated by Terahertz Polarization Spectroscopy: Fundamentals and Applications, Polymers 2019, 11, 9; doi: 10.3390/ polym11010009, Accepted: Dec. 18, 2018; Published: Dec. 21, 2018 (Year: 2018).*

(Continued)

*Primary Examiner* — Hugh Maupin
(74) *Attorney, Agent, or Firm* — Katherine A. Smith

(57) ABSTRACT

Aspects of the present invention relate to methods for characterizing a multi-layered tire tread. In one example, a method comprises providing a first rubber composition having a first refractive index and providing a second rubber composition having a second refractive index. The method further comprises determining a difference between the first refractive index and the second refractive index and comparing the difference to a threshold refractive index. In addition, the method comprises adding a refractive index modifier to the first rubber composition and/or second rubber composition in case the comparison provides that the (Continued)

difference is lower than the threshold refractive index, so that the difference is greater than, or equal to, the threshold refractive index.

18 Claims, 5 Drawing Sheets

(56) References Cited

U.S. PATENT DOCUMENTS

| | | |
|---|---|---|
| 2016/0047753 A1* | 2/2016 | Huber .................... G01N 21/59 |
| | | 250/341.1 |
| 2019/0275723 A1 | 9/2019 | Rupprecht |
| 2020/0249153 A1 | 8/2020 | Pourkazemi |
| 2021/0010934 A1* | 1/2021 | Nakanishi .............. G01N 21/55 |
| 2021/0032439 A1* | 2/2021 | Gong ........................ C08L 7/00 |
| 2023/0392995 A1* | 12/2023 | Montoy ................ B29C 35/002 |

FOREIGN PATENT DOCUMENTS

| | | |
|---|---|---|
| JP | 2016161462 A | 9/2016 |
| LU | 100945 B1 | 3/2020 |
| WO | 2015028166 A1 | 3/2015 |

OTHER PUBLICATIONS

Search Report and Written Opinion for Brazilian Application No. BR102023017015-3, dated Apr. 30, 2024.

* cited by examiner

TERAHERTZ CHARACTERIZATION OF A MULTI-LAYERED TIRE TREAD

FIELD OF THE INVENTION

The present invention generally relates to methods for characterizing a multi-layered tire tread, and in particular, for determining a thickness of each layer of the tire tread and determining an electrical conductivity of a possible electrically conductive compound inclusion.

BACKGROUND OF THE INVENTION

The manufacture of treads for vehicle tires is typically done with extruders. Conventionally, treads are formed of several layers of material, which may be made of different materials in order to provide the desired performance. It is important that the tread layer have a controlled thickness for tire uniformity and performance, in particular, sub-millimeter precision is highly beneficial. It is known to use radar technology for tread thickness measurements during manufacture, which has significant limitations.

For example, EP2985585 discloses a method for testing a tire, the tire being irradiated with electromagnetic radiation in the terahertz (THz) frequency range. The radiation reflected from the tire is received and evaluated.

SUMMARY OF THE INVENTION

A first aspect of the present invention relates to a method for characterizing a multi-layered tire tread. The method comprises:
  providing a first rubber composition having a first refractive index;
  providing a second rubber composition having a second refractive index;
  determining a difference between the first refractive index and the second refractive index;
  comparing the difference to a threshold refractive index;
  adding a refractive index modifier to the first rubber composition and/or second rubber composition in case the comparison provides that difference is lower than the threshold refractive index, so that the difference is greater than, or equal to, the threshold refractive index;
  producing a multi-layered tire tread comprising a first layer comprising the first rubber composition and also comprising a second layer comprising the second rubber composition, the first rubber composition or the second rubber composition comprising the added refractive index modifier in case the refractive index modifier is added;
  irradiating the multi-layered tire tread with a THz electromagnetic radiation; and
  receiving radiation transmitted through the multi-layered tire tread and/or radiation reflected by the multi-layered tire tread.

A second aspect of the present invention relates to a method for characterizing a multi-layered tire tread. The method comprises:
  providing a first rubber composition having a first initial refractive index;
  providing a second rubber composition having a second initial refractive index;
  adding a refractive index modifier to the first rubber composition, the first rubber composition thereby having a first refractive index greater or lower than the first initial refractive index, and/or to the second rubber composition, the second rubber composition thereby having a second refractive index greater or lower than the second initial refractive index, so that a difference between the first refractive index and the second refractive index is greater than, or equal to, a threshold refractive index;
  producing a multi-layered tire tread comprising a first layer comprising the first rubber composition and also comprising a second layer comprising the second rubber composition, the first rubber composition and/or the second rubber composition comprising the added refractive index modifier in case the refractive index modifier is added;
  irradiating the multi-layered tire tread with a THz electromagnetic radiation; and
  receiving radiation transmitted through the multi-layered tire tread and/or radiation reflected by the multi-layered tire tread.

The below embodiments relate to both the first and second aspects of the present invention.

The threshold refractive index may be comprised in a range from 0.07 to 0.15, preferably in a range from 0.09 to 0.13, more preferably in a range from 0.1 to 0.12.

The THz electromagnetic radiation may be a pulsed electromagnetic radiation.

The THz electromagnetic radiation may have a frequency comprised in a range from 50 GHz to 10 THz, preferably in a range from 50 GHz to 1 THz, more preferably in a range from 50 GHz to 400 GHz.

The refractive index modifier may be added in an amount comprised between 0.01 phr and 7 phr, preferably in an amount comprised between 0.1 phr and 6 phr, more preferably in an amount comprised between 1 phr and 5 phr.

In an embodiment, one or more refractive index modifiers may be added. For example, a first refractive index modifier may be added to the first rubber composition and a second refractive index modifier may be added to the second rubber composition.

In an embodiment, the refractive index modifier is a refractive index increaser.

The refractive index increaser may comprise at least one of carbon black, titanium dioxide and aluminum hydroxide.

In an embodiment, the refractive index modifier is a refractive index lowerer.

In an embodiment, at least one of the first rubber composition and the second rubber composition comprises silica. At least one of the first rubber composition and the second rubber composition may comprise from 20% to 45% wt of silica.

In an embodiment, the method may comprise processing a received radiation, the processing comprising determining a presence or an absence of an electrically conductive rubber in the multi-layered tire tread.

The irradiated THz electromagnetic radiation may have an incident intensity and the received radiation may have a detected intensity. The determination of the presence or the absence of the electrically conductive rubber may be based on a ratio between the detected intensity and the incident intensity.

The irradiated THz electromagnetic radiation may have an incident intensity and the received radiation may have a detected intensity. The method may comprise determining a conductivity of the electrically conductive rubber and/or a span of the electrically conductive rubber in contact with a surface of the multi-layered tire tread, wherein determining the electrical conductivity and/or the span of the electrically conductive rubber may be based on a ratio between the detected intensity and the incident intensity.

In an embodiment, the characterization may comprise processing a received radiation. The processing may comprise determining at least one of a thickness of the first and second layers.

The determination of the at least one of the thickness of the first and second layers may be based on a time difference between the irradiated THz electromagnetic radiation and one or more echoes of the received radiation.

The production of the multi-layered tire tread may comprise (co-)extruding the first and second rubber compositions by an extruder.

The extruder may have first and second inlets, wherein the first and second rubber compositions may be fed to the first and second inlets, respectively, and the refractive index increaser may be added in either one of the first and second inlets.

Definitions

As used herein, the term "rubber" is intended to include both natural rubber compositions and synthetic rubber compositions. Unless otherwise specified, "rubber" designates an uncured rubber. The expression "rubber composition", "compounded rubber", and "rubber compound" may be used interchangeably to refer to rubber (elastomer), which has been blended or mixed with various ingredients and materials, e.g., reinforcing fillers, precipitated amorphous silica, or the like. Specific examples of rubbers include neoprene (polychloroprene), polybutadiene (e.g., cis-1,4-polybutadiene), polyisoprene (e.g., cis-1,4-polyisoprene), butyl rubber, halobutyl rubber (such as, e.g., chlorobutyl rubber or bromobutyl rubber), styrene/isoprene/butadiene rubber, copolymers of 1,3-butadiene or isoprene with monomers such as, e.g., styrene, acrylonitrile and methyl methacrylate. Other types of rubber include carboxylated rubber, silicon-coupled rubber, or tin-coupled star-branched polymers. Rubber compositions may include green rubber. Cured rubber may typically be obtained from unsaturated rubber by sulfur or non-sulfur vulcanization. The rubber need not be completely cured, i.e., its molecular chains may contain residual cure sites (e.g., allylic positions) available for crosslinking with other molecular chains.

As used herein, the term "refractive index increaser" is an additive which increases the refractive index of the composition to which it is added to.

As used herein, the term "refractive index lowerer" is an additive which lowers the refractive index of the composition to which it is added to.

As used herein, the term "refractive index modifier" is an additive which modifies the refractive index of the composition to which it is added to.

The expression "electrically conductive rubber", as used herein, designates rubber having a volume resistivity at room temperature (20° C.) of less than 108 Ω·cm, or, more preferably, of less than 106 Ω·cm. Electrically conductive rubber may be obtained from a mix of different rubber compositions, provided that the resulting volume resistivity is as defined above. Electrically conductive rubber can be obtained by blending elastomer(s) with one or more electrically conducting materials (e.g., in the form of a powder, flakes, filaments, etc.).

The expression "electrically non-conductive rubber", as used herein, designates rubber having a volume resistivity at a room temperature (20° C.) equal to or greater than 108 Ω·cm. Electrically non-conductive rubber may be obtained by using non-conducting filler or reinforcing material(s). However, electrically non-conductive rubber may contain electrically conducting components, provided that the resulting volume resistivity is higher than the above-defined threshold value. Electrically non-conductive rubber may be produced, e.g., with non-conducting filler, such as, e.g, silica.

The expression "phr" stands for parts by weight in relation to 100 parts by weight of rubber (elastomer resin).

As used herein, the term "tire tread" is the outermost element of a tire that is configured to make contact with the road or the ground.

In the present document, the verb "to comprise" and the expression "to be comprised of" are used as open transitional phrases meaning "to include" or "to consist at least of". Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context). When reference is made to "an embodiment", "one embodiment", "embodiments", etc., this means that these embodiments may be combined with one another. Furthermore, the features of those embodiments can be used in the combination explicitly presented but also that the features can be combined across embodiments without departing from the invention, unless it follows from context that features cannot be combined.

BRIEF DESCRIPTION OF THE DRAWINGS

The invention will be described by way of example and with reference to the accompanying drawings in which.

The reader's attention is drawn to the fact that the drawings are not to scale. Furthermore, for the sake of clarity, proportions between height, length and/or width may not have been represented correctly.

DETAILED DESCRIPTION OF THE INVENTION

Figure 1:
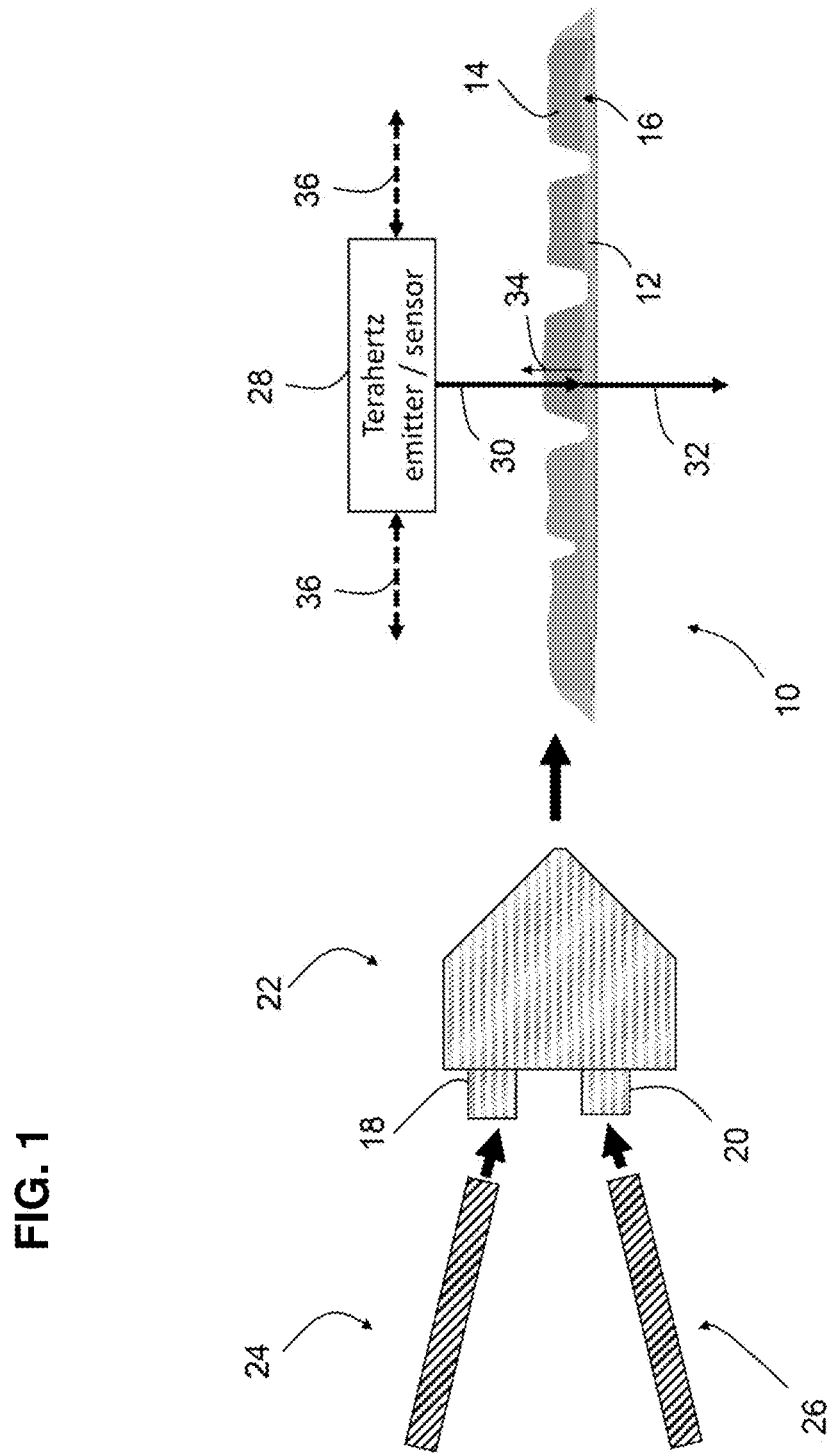
FIG. 1 is a schematic representation of a method for characterizing a multi-layered tire tread.

FIG. 1 shows a method for characterizing a multi-layered tire tread 10. The multi-layered tire tread 10 is produced by (co-)extrusion, by an extruder 22 and comprises a first layer 12 and a second layer 14 on top of the first layer 12. The first and second layers 12, 14 are in (direct) contact and form an interface 16. The extruder 22 may comprise a first inlet 18 and a second inlet 20 for providing corresponding curable rubber compositions 24, 26 in order to form a two-layer tire tread. Of course, while the present description discloses two layers 12, 14 for the multi-layered tire tread 10, any number of layers is contemplated. To do so, the extruder 22 may accommodate more than two inlets so as to enable the production of a multi-layered tire tread having more than two layers.

A first rubber composition 24 is provided to the first inlet 18 of the extruder 22 and a second rubber composition 26 is provided to the second inlet 20 of the extruder 22. The first and second rubber compositions 24, 26 may have different rubber compositions for achieving different (desired) physical parameters (e.g. dynamic modulus) but still have (substantially) the same refractive indices. This renders difficult characterization of the tire tread 10 for quality control, in particular when a thickness of each layer 12, 14 should be examined.

FIG. 1 shows such an example, wherein a thickness of the tire tread layers 12, 14 is controlled by THz irradiation. In particular, the THz emitter 28 irradiates the multi-layered tire tread 10 with a THz electromagnetic radiation 30. The response of the multi-layered tire tread 10 is then received, i.e. a radiation transmitted 32 through the multi-layered tire tread 10 and/or radiation reflected 34 by the multi-layered tire tread 10 is received by the THz sensor 28. The THz sensor 28 may be accommodated in the THz emitter 28 (as depicted) or may be a separate instrument. The THz sensor 28 may be located on a same side of the tire tread 10 relative to the THz emitter 28 so that the reflected radiation 34 is received. Of course, the THz sensor 28 may be placed opposite of the THz emitter 28 with respect to the tire tread 10 so that the transmitted radiation 32 is received. In the present case, since the refractive index difference is very small, it is difficult to determine the thicknesses of the layers 12, 14 as the reflectance at the interface 16 is very close to zero. In plain English, the interface 16 is nearly transparent for the incident THz radiation 30.

The thickness may be controlled at different locations by translating 36 the THz emitter/sensor 28 in a direction transversal to a conveying direction of the tread 10 in the production line (not depicted). The translation in the transversal direction and the conveying of the tread 10 allows for controlling any desired location of the tire tread 10.

The THz emitter 28 may emit a continuous wave or emit pulses of THz radiation. The THz radiation may have a frequency comprised in the range from 50 GHz to 10 THz, preferably in the range from 50 GHz to 1 THz, more preferably in the range from 50 GHz to 400 GHz.

The characterization of the multi-layered tire tread 10 may comprise determining a thickness of at least one of the layers 12, 14 of the tire tread 10. The determination may be based on time difference between the irradiated electromagnetic radiation and one or more echoes (e.g. transmitted and/or reflected radiation) of the received radiation.

Typical first and second compositions are reported in Table 1 below.

TABLE 1

|  | First composition (parts) | Second composition (parts) |
| --- | --- | --- |
| Styrene-butadiene rubber 1 | 36.75 | 47.25 |
| Styrene-butadiene rubber 2 | 20.8 |  |
| Styrene-butadiene rubber 3 |  | 35 |
| Natural rubber | 20 | 20 |
| Silica | 57 | 120 |
| Silane | 5.7 | 15.4 |
| Resin 1 | 20.8 |  |

TABLE 1-continued

|  | First composition (parts) | Second composition (parts) |
| --- | --- | --- |
| Resin 2 |  | 36 |
| Oil |  | 6 |
| Process aid |  | 3.5 |
| Antidegradants | 6 | 9.95 |
| Curatives | 8.95 | 8.4 |
| Carbon black | 1 | 1 |
| TOTAL | 202.2 | 302.2 |

In Table 1, Styrene-butadiene rubber 1 is LG Chemicals F1038, Styrene-butadiene rubber 2 is JSR HPR 355H, Styrene-butadiene rubber 3 is Enichem Europrene BR HV80, Silica is Solvay Zeosil Premium 200MP, Silane is Momentive Performance Materials NXT Silane, Resin 1 is Kolon Chemicals Sukorez SU-400, Resin 2 is DRT Dercolyte A115, Oil is Cargill Agripure AP-65, Process aid is Peter Greven Ligalub 11GE, Antidegradants is Wax, mixture of aryl-p-pZhenylene diamines, polymerized trimethyl dihydroquinoline, and/or N-1,3 dimethylbutyl-N'-phenyl-p-phenylenediamine and Curatives is stearic acid, zinc oxide, accelerators, and/or sulfur.

The refractive index difference between the first and second compositions is 0.004.

Figure 2:
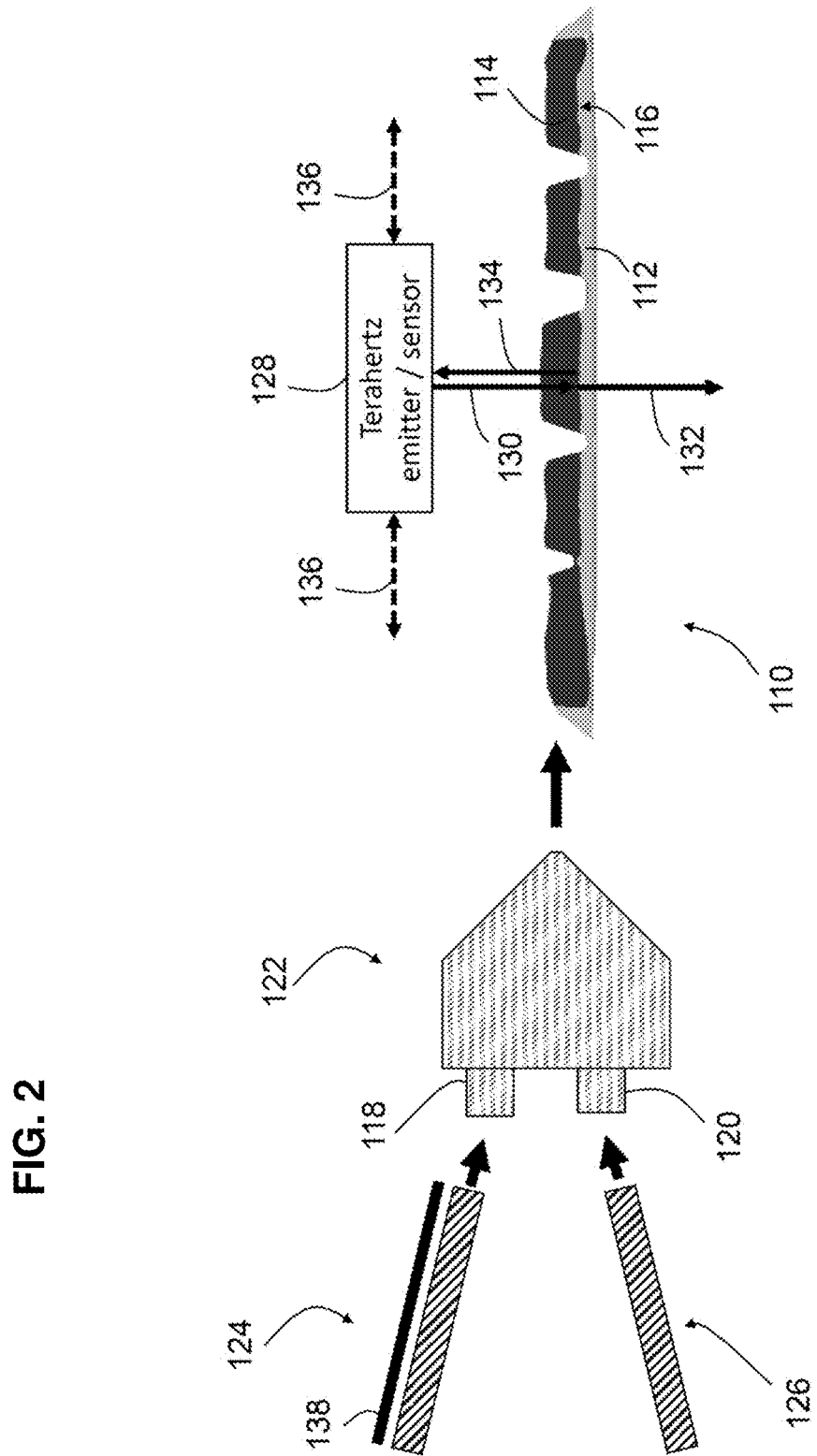
FIG. 2 is a is a schematic representation of a method for characterizing a multi-layered tire tread, according to an embodiment of the present invention.

FIG. 2 shows a method for characterizing a multi-layered tire tread 110 according to an embodiment of the present invention. The embodiment differs from what is disclosed in relation to FIG. 1 only in that a refractive index increaser 138 is added in conjunction with a first curable rubber composition 124 in a first inlet 118 of an extruder 122. Of course, in other embodiments and depending on the needs, the refractive index increaser 138 may be added in a second inlet 120. In details, the method comprises adding a refractive index increaser to the first rubber composition 124, the first rubber composition 124 thereby having a first refractive index greater than a first initial refractive index, or to a second rubber composition 126, the second rubber composition 126 thereby having a second refractive index greater than a second initial refractive index, so that the difference between the first refractive index and the second refractive index is greater than, or equal to, a threshold refractive index. The refractive index increaser may be presented in a form of a strip.

In other embodiments, the refractive index increaser may be replaced by a refractive index lowerer. The below considerations are, mutatis mutandis, equally valid for a refractive index lowerer.

The threshold refractive index may be comprised in the range from 0.01 to 0.07, preferably in the range from 0.02 to 0.06, more preferably in the range from 0.03 to 0.055. The refractive index increaser may be added in an amount comprised between 0.01 phr and 7 phr, preferably in an amount comprised between 0.1 phr and 6 phr, more preferably in an amount comprised between 1 phr and 5 phr, relative to the rubber composition to which it is added.

For example, adding 2 phr of carbon black to the first composition or second composition as disclosed in Table 1 allows for achieving a refractive index difference of 0.05.

It has been discovered that adding refractive index increaser in an amount as disclosed herein negligibly affects physical parameters of the first and second layers (e.g. dynamic modulus) but allows for effectively increasing the refractive index difference in an amount effective to allow for improved characterization of the tire tread with THz radiation.

Of course, it is possible to benchmark the amount of refractive index increaser so that a minimal amount is added but still allows for an improved THz characterization. For example, the relative amount of refractive index increaser may be varied during production of a test tire tread, and it may be possible to detect the optimal amount of refractive index increaser for an improved THz characterization.

In other embodiments, the refractive index increaser may be added to the rubber composition "offline", i.e. not during extrusion. This may be achieved, e.g., while mixing the rubber compositions. The change in refractive index may then be determined THz sensing as described herein. Refractive index increaser is added as long as the difference is below the threshold refractive index.

The refractive index increaser may comprise (or consist of) at least one of carbon black, titanium dioxide and aluminum hydroxide.

Figure 3:
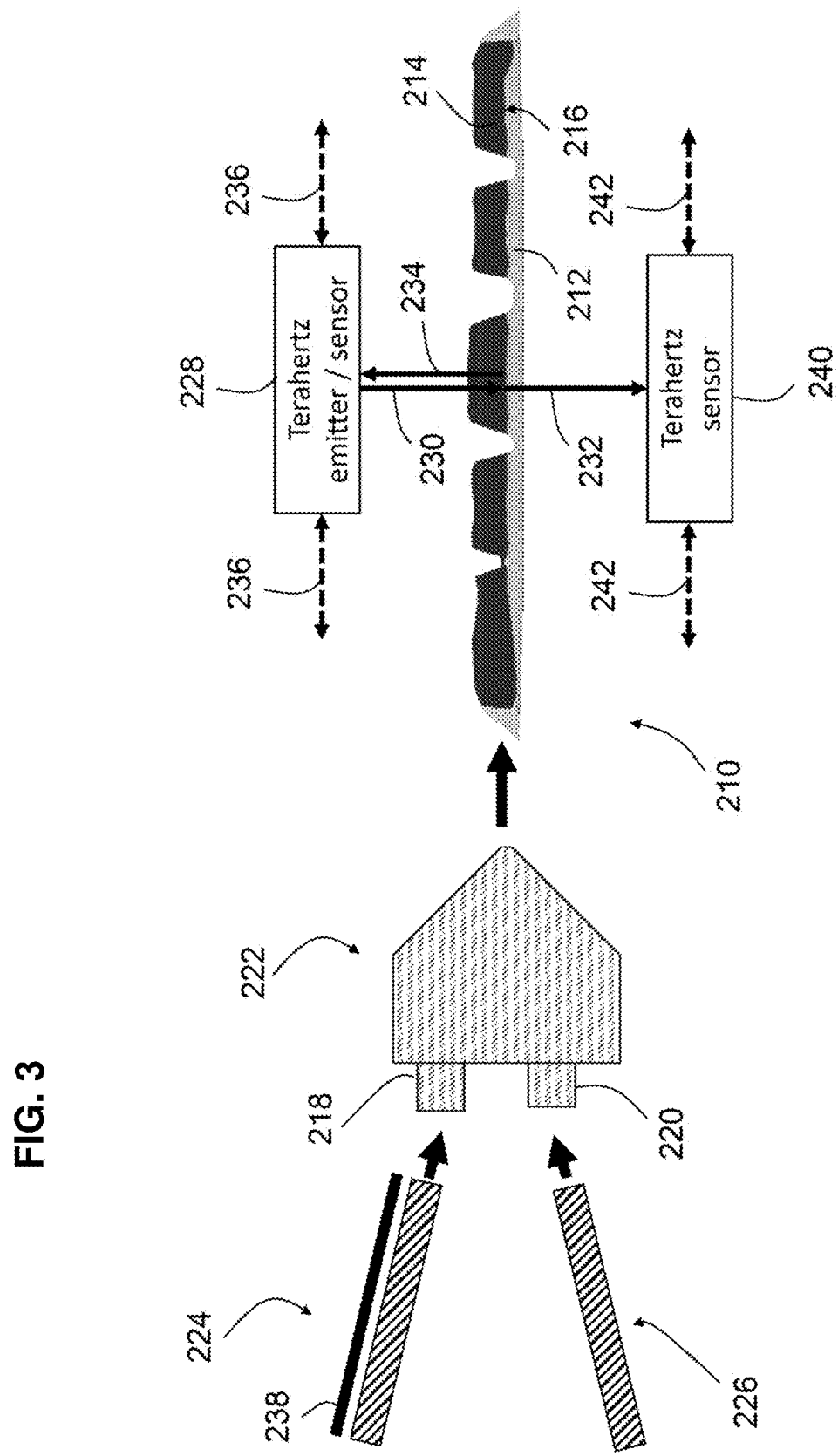
FIG. 3 is a is a schematic representation of a method for characterizing a multi-layered tire tread, according to an embodiment of the present invention.

FIG. 3 shows a method for characterizing a multi-layered tire tread 210 according to an embodiment of the present invention. The embodiment differs from what is disclosed in relation to FIG. 2 only in that an additional THz sensor 240 is arranged opposite to a THz emitter/sensor 228, with respect to the tire tread 210. Having sensors on both sides of the tire tread 210 allows for receiving both reflected and transmitted beams 232, 234, thereby improving the characterization (e.g. a thickness of the layers) of the tire tread 210. In addition, in an embodiment, the THz sensor 240 also has emitting capabilities (as the THz emitter/sensor 228), this allows for (separately) sensing both sides of the tire tread 210. This may be advantageous in case the signal detected only with one THz emitter is too weak. The THz sensor 240 may also be translated 236, as for THz emitter/sensor 228. Advantageously, both translations are operated the same way for both, so that both are on top of each other.

Figure 4:
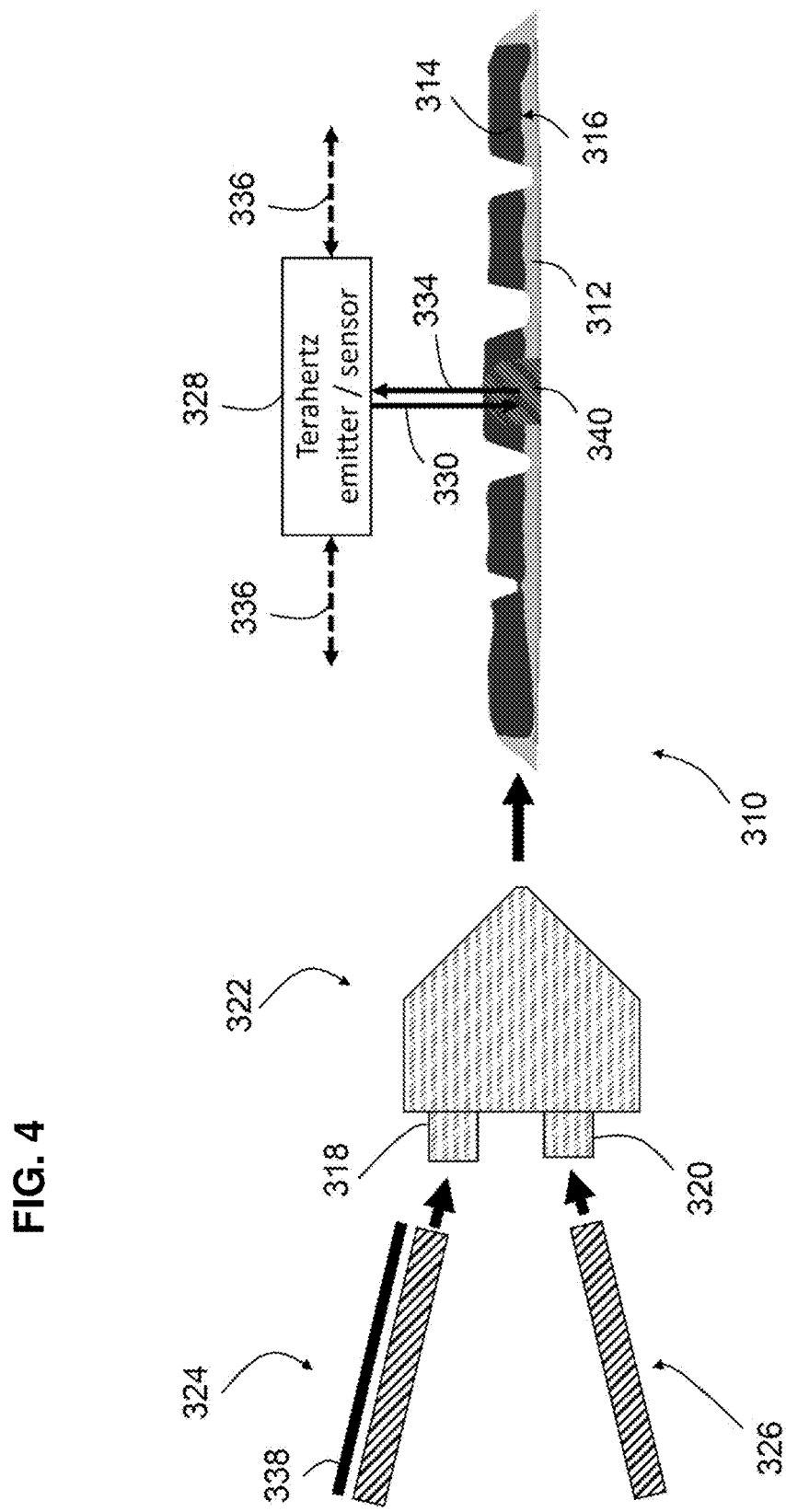
FIG. 4 is a is a schematic representation of a method for characterizing a multi-layered tire tread, according to an embodiment of the present invention.

FIG. 4 shows a method for characterizing a multi-layered tire tread 310 according to an embodiment of the present invention. In this embodiment, the tire tread 310 comprises an electrically conductive rubber inclusion (also referred to as "conductive chimney" in this document) 340 comprising electrically conductive rubber. It should be noted that, to reduce $CO_2$ emissions or fuel consumption of vehicles, tire manufactures are solicited to provide tires having improved (reduced) rolling resistance. To reduce the rolling resistance of tires is to use other reinforcement agents (i.e. other than ones traditionally used), such as, e.g., silica. Accordingly, modern tires may comprise rubber mixes containing as their principal filler one or more electrically non-conducting fillers, such as, e.g., silica. Therefore, tires exhibiting good performance in terms of rolling resistance are currently considered as challenging in terms of electrical conductivity, which is needed in practice to prevent charge build-up between ground and the vehicle. This problem is tackled by providing one or more electrically conductive rubber inclusions, the so-called conductive chimneys. The conductive chimney ensures that a conductive path exists between tire casing and surface. The chimney may be co-extruded with the tread, either as a separate component, or as a combined base-chimney, or skirt-base-chimney component. Production issues can cause insufficient chimney conductivity, insufficient chimney width, or a smear of electrically non-conductive rubber over the chimney. These issues all lead to insufficient tire conductivity.

In FIG. 4, the conductive chimney is designated by reference sign 340. The method for characterizing a multi-layered tire tread 310 may comprise processing a received radiation 334, the processing comprising determining a presence or an absence of the conductive chimney 340 in the multi-layered tire tread 310. The conductive chimney 340 reflects a substantial part of an incident radiation 330. Therefore, a ratio between a detected (transmitted or reflected) intensity and an incident intensity shows the presence or the absence of the conductive chimney 340. Indeed, in the case of reflection, the ratio increases in the presence of the conductive chimney 340 when compared to the ratio in the absence thereof. Conversely, in the case of transmission, the ratio decreases in the presence of the conductive chimney 340 when compared to the ratio in the absence thereof (in that case a THz sensor 328 may be placed opposite the THz emitter 328 so as to receive the transmitted radiation 330). Therefore, while scanning the tire tread 310 with the THz emitter/sensor 328 (or separated THz sensor), an increase (resp. decrease) in the ratio indicates the presence of a chimney 340. It will be appreciated that the scanning combined with the increase (resp. decrease) in the ratio also allows for determining a width and/or a length of the chimney 340.

In addition, the method may comprise determining a conductivity of the conductive chimney 340 on the basis of the ratio between the detected intensity and the incident intensity. Indeed, a reflected intensity is proportional to the conductivity of the surface of the conductive chimney 340, and thus increases (decreases) when the incident radiation 330 is reflected (resp. transmitted) by the conductive chimney 340.

A lookup table may then be used to convert the received THz radiation 334 to an electrical conductivity in Ohms.

Figure 5:
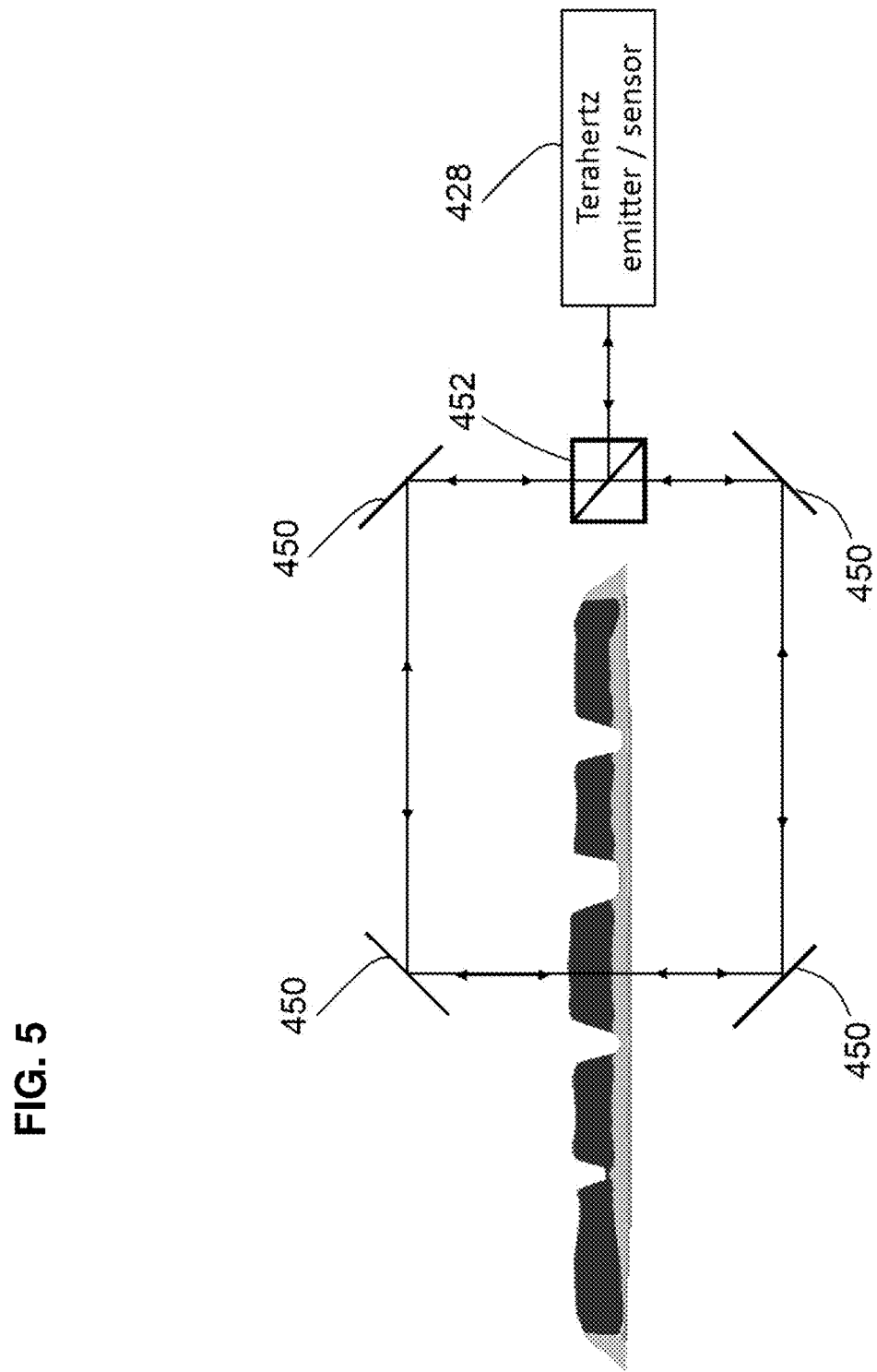
FIG. 5 is a is a schematic representation of another arrangement for the THz emitter/sensor.

While, in the above embodiments, the THz sensors and emitters are disclosed as being below and/or above the tire tread, other arrangements are also contemplated. For example, as shown in FIG. 5, a THz emitter/sensor 428 may be arranged on one side of a tire tread and a THz radiation may be directed above (an upper optical branch) and/or below (a lower optical branch) the tire tread by mirrors 450 and a beam splitter 452. Of course, any other beam separation apparatus other than a beam splitter is contemplated. For example, a system switching between the upper branch and the lower branch of the optical path as a function of time may offer advantages. The switching may be regular (periodic) or irregular in time. As for the THZ sensor/emitter of the previous embodiments, mirrors 450 may be translated so as to enable scanning the tire tread in a direction transversal to the conveying direction.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for characterizing a multi-layered tire tread, the method comprising:
   producing a multi-layered tire tread comprising a first layer comprising a first rubber composition and a second layer comprising a second rubber composition, wherein the first rubber composition has a first refractive index and the second rubber composition has a second refractive index, and a difference between the first refractive index and the second refractive index is greater than, equal to, or lower than a threshold refractive index;

irradiating the multi-layered tire tread with a THz electromagnetic radiation; and receiving radiation transmitted through the multi-layered tire tread and/or radiation reflected by the multi-layered tire tread, wherein the method further comprises adding a refractive index modifier to the first rubber composition and/or second rubber composition in case the comparison provides that the difference is greater than or lower than the threshold refractive index, and wherein an amount of the refractive index modifier is varied during the step of producing a multi-layered tire tread.

2. The method according to claim 1, wherein the THz electromagnetic radiation is one of a continuous wave or a pulsed electromagnetic radiation.

3. The method according to claim 1, wherein the method further comprises processing a received radiation, the processing comprising determining a presence or an absence of an electrically conductive rubber in the multi-layered tire tread.

4. The method according to claim 3, the irradiated THz electromagnetic radiation having an incident intensity and the received radiation having a detected intensity, wherein the determination of the presence or the absence of the electrically conductive rubber is based on a ratio between the detected intensity and the incident intensity.

5. The method according to claim 3, the irradiated THz electromagnetic radiation having an incident intensity and the received radiation having a detected intensity, comprising determining a conductivity of the electrically conductive rubber and/or a span of the electrically conductive rubber in contact with a surface of the multi-layered tire tread, wherein determining the electrical conductivity and/or the span of the electrically conductive rubber is based on a ratio between the detected intensity and the incident intensity.

6. The method according to claim 1, wherein the method further comprises processing a received radiation, the processing comprising determining at least one of a thickness of the first or second layers.

7. The method according to claim 6, the determination of the at least one of the thickness of the first or second layers being based on a time difference between the irradiated THz electromagnetic radiation and one or more echoes of the received radiation.

8. The method according to claim 1, wherein the production of the multi-layered tire tread comprises extruding the first and second rubber compositions by an extruder.

9. The method of claim 8, wherein the extruding the first and second rubber compositions by the extruder occurs on a production line.

10. The method according to claim 1, wherein the THz radiation has a frequency comprised in the range from 50 GHz to 10 THz.

11. The method according to claim 1, wherein the refractive index modifier is one of a refractive index increaser or a refractive index lowerer.

12. The method according to claim 11, wherein the refractive index increaser comprises at least one of a carbon black, a titanium dioxide, or an aluminum hydroxide.

13. The method according to claim 1, wherein the refractive index modifier is in the form of a strip.

14. The method according to claim 1, wherein the refractive index modifier is added while mixing the first rubber composition.

15. The method according to claim 1, wherein the refractive index modifier is added while mixing the second rubber composition.

16. The method according to claim 1, the threshold refractive index being comprised in a range from 0.07 to 0.15.

17. The method according to claim 1, wherein the method further comprises:

determining a difference between the first refractive index and the second refractive index;

comparing the difference to a threshold refractive index;

adding a refractive index modifier to the first rubber composition and/or second rubber composition in case the comparison provides that difference is lower than the threshold refractive index, so that the difference is greater than, or equal to, the threshold refractive index;

producing a multi-layered tire tread comprising a first layer comprising the first rubber composition and also comprising a second layer comprising the second rubber composition, the first rubber composition or the second rubber composition comprising the added refractive index modifier in case the refractive index modifier is added.

18. A method for characterizing a multi-layered tire tread, the method comprising:

producing a multi-layered tire tread comprising a first layer comprising a first rubber composition and a second layer comprising a second rubber composition, wherein the first rubber composition has a first refractive index and the second rubber composition has a second refractive index, and a difference between the first refractive index and the second refractive index is greater than, equal to, or lower than a threshold refractive index;

irradiating the multi-layered tire tread with a THz electromagnetic radiation; and receiving radiation transmitted through the multi-layered tire tread and/or radiation reflected by the multi-layered tire tread, wherein the method further comprises adding a refractive index modifier to the first rubber composition and/or second rubber composition in case the comparison provides that the difference is greater than or lower than the threshold refractive index, and wherein the refractive index modifier is in the form of a strip.

* * * * *